(12) United States Patent
Chen et al.

(10) Patent No.: US 10,261,355 B2
(45) Date of Patent: Apr. 16, 2019

(54) DISPLAY DEVICE AND FABRICATION METHOD THEREOF

(71) Applicants: BOE TECHNOLOGY GROUP CO., LTD, Beijing (CN); HEFEI BOE OPTOELECTRONICS TECHNOLOGY CO., LTD., Hefei (CN)

(72) Inventors: Changdi Chen, Beijing (CN); Tao Yang, Beijing (CN)

(73) Assignees: BOE TECHNOLOGY GROUP CO., LTD, Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/501,032

(22) PCT Filed: Jun. 7, 2016

(86) PCT No.: PCT/CN2016/085099
§ 371 (c)(1),
(2) Date: Feb. 1, 2017

(87) PCT Pub. No.: WO2017/063373
PCT Pub. Date: Apr. 20, 2017

(65) Prior Publication Data
US 2017/0276986 A1    Sep. 28, 2017

(30) Foreign Application Priority Data
Oct. 15, 2015    (CN) .......................... 2015 1 0670651

(51) Int. Cl.
*G02F 1/1333*    (2006.01)
*G02F 1/1335*    (2006.01)
(Continued)

(52) U.S. Cl.
CPC ........ *G02F 1/13338* (2013.01); *G02F 1/1339* (2013.01); *G02F 1/133345* (2013.01);
(Continued)

(58) Field of Classification Search
CPC ............. G02F 1/13338; G02F 1/13352; G02F 2001/133331; G02F 2202/288;
(Continued)

(56) References Cited

U.S. PATENT DOCUMENTS

| | | | |
|---|---|---|---|
| 2012/0212890 A1 | 8/2012 | Hoshino et al. | |
| 2013/0027629 A1* | 1/2013 | Kiyohara | G02F 1/133308 349/58 |

(Continued)

FOREIGN PATENT DOCUMENTS

| | | |
|---|---|---|
| CN | 101452351 B | 11/2010 |
| CN | 101916154 A | 12/2010 |

(Continued)

OTHER PUBLICATIONS

State Intellectual Property Office of the P.R.C (SIPO) Office Action 1 for 2015106706516 dated Jul. 13, 2017 17 Pages.
(Continued)

*Primary Examiner* — Angela K Davison
(74) *Attorney, Agent, or Firm* — Anova Law Group, PLLC

(57) ABSTRACT

The present disclosure provides a display device, including a display panel; a sealant layer on the display panel; a transparent protective layer covering an active area of the display panel; and a protective cover fixed by the sealant layer to cover the transparent protective layer. The transparent protective layer fills up a gap between the protective cover and the display panel, a refractive index of the transparent protective layer being substantially close to a refractive index of the protective cover.

20 Claims, 2 Drawing Sheets

(51) Int. Cl.
*G02F 1/1339* (2006.01)
*G06F 3/041* (2006.01)

(52) U.S. Cl.
CPC ...... *G02F 1/133528* (2013.01); *G06F 3/0412* (2013.01); *G02F 2001/133357* (2013.01); *G02F 2201/50* (2013.01); *G06F 2203/04103* (2013.01)

(58) Field of Classification Search
CPC .... G02F 2202/28; G06F 3/041; G06F 3/0412; G06F 3/044; G06F 3/045; G06F 3/047
See application file for complete search history.

(56) References Cited

U.S. PATENT DOCUMENTS

| | | | |
|---|---|---|---|
| 2013/0063820 A1 | 3/2013 | Yang et al. | |
| 2014/0240619 A1 | 8/2014 | Yokohama et al. | |
| 2014/0327654 A1* | 11/2014 | Sugita | G06F 3/044 345/174 |
| 2015/0370357 A1 | 12/2015 | Hsu et al. | |
| 2016/0239118 A1* | 8/2016 | Yoon | G06F 3/041 |

FOREIGN PATENT DOCUMENTS

| | | |
|---|---|---|
| CN | 202018550 U | 10/2011 |
| CN | 102999196 A | 3/2013 |
| CN | 203376716 U | 1/2014 |
| CN | 103870064 A | 6/2014 |
| CN | 104007872 A | 8/2014 |
| CN | 203982335 U | 12/2014 |
| CN | 204009808 U | 12/2014 |
| CN | 204242134 U | 4/2015 |
| CN | 204423338 U | 6/2015 |
| CN | 105138191 A | 12/2015 |
| CN | 204990261 U | 1/2016 |
| JP | 2006011523 A | 1/2006 |
| TW | M493100 U | 1/2015 |
| WO | 2006007071 A1 | 1/2006 |

OTHER PUBLICATIONS

State Intellectual Property Office of the P.R.C (SIPO) Office Action 2 for 201510670651.6 dated Dec. 27, 2017 19 Pages (including translation).
The World Intellectual Property Organization (WIPO) International Search Report for PCT/CN2016/085099 dated Sep. 20, 2016 p. 1-13.
State Intellectual Property Office of the P.R.C (SIPO) Office Action 3 for 201510670651.6 dated Jul. 4, 2018 26 Pages.

* cited by examiner

DISPLAY DEVICE AND FABRICATION METHOD THEREOF

CROSS-REFERENCES TO RELATED APPLICATIONS

This application is a national phase entry under 35 U.S.C. § 371 of International Application No. PCT/CN2016/085099, filed on Jun. 7, 2016, which claims priority to Chinese Patent Application No. 201510670651.6, filed on Oct. 15, 2015. The above enumerated patent applications are incorporated by reference herein in their entirety.

FIELD OF THE INVENTION

The present invention generally relates to the display technologies and, more particularly, relates to a display device and a fabrication method for forming the display device.

BACKGROUND

To use an existing, display panel, the user often needs to frequently touch or press the screen of the display panel. For this reason, an additional protective cover is often used to protect the screen after the display panel is formed. Currently, sealant or sealant glue is often used to attach the protective cover onto the surface of the display panel.

BRIEF SUMMARY OF THE DISCLOSURE

The present disclosure provides a display device and a fabrication, method for forming the display device. By using the disclosed display device and the fabrication method, the optical display effect of the display device may be improved.

One aspect of the present disclosure includes a display device, display panel; a sealant layer on the display panel; a transparent protective layer covering an active area of the display panel; and a protective cover fixed by the sealant layer to cover the transparent protective layer. The transparent protective layer fills up a gap between the protective cover and the display panel, a refractive index of the transparent, protective layer being substantially close to a refractive index of the protective cover.

Optionally, a gap is formed between the transparent protective layer and the sealant layer.

Optionally, a boundary of the transparent protective layer contacts a boundary of the sealant layer.

Optionally, the refractive index of the transparent protective layer is substantially close to a refractive index of a portion of the display panel that contacts the transparent protective layer.

Optionally, the refractive index of the transparent protective layer is about 1.5 to 1.7.

Optionally, the transparent protective layer is a planarization layer made of an insulating material.

Optionally, the touch-sensing components include touch-sensing electrodes on the display panel covered by the transparent protective layer.

Optionally, the touch-sensing components include touch-sensing electrodes in the display panel.

Optionally, the display panel is one of a liquid crystal display (LCD) panel, an organic light-emitting diode (OLED) display panel, a cathode ray tube (CRT) display panel, a plasma display panel, an electronic paper, or an electroluminescent display panel.

Optionally, when the display panel is an LCD panel, a polarizer is formed under the touch-sensing components in the display panel.

Optionally, the display panel is a touch display panel with touch-sensing components for sensing and responding to touch motions.

Another aspect of the present disclosure provides a fabrication method for forming a display device, the display device having a display panel, a sealant layer on the display panel, a transparent protective layer covering an active area of the display panel, and a protective cover fixed by the sealant layer for covering the transparent protective layer. The method includes providing the display panel with touch-sensing components; forming the transparent protective layer on the active area of the display panel; applying the sealant layer on the display panel at a same side as the transparent protective layer; and binding the protective cover on the transparent protective layer. The transparent protective layer fills a gap between the protective cover and the display panel, a refractive index of the transparent protective layer being substantially close to a refractive index of the protective cover.

Optionally, the fabrication method further includes applying a transfer-printing process to bind the transparent protective layer on the active area of the display panel, wherein a same mask is used in a transfer-priming process for thrilling the active area and the transfer-printing process for forming the transparent protective layer Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
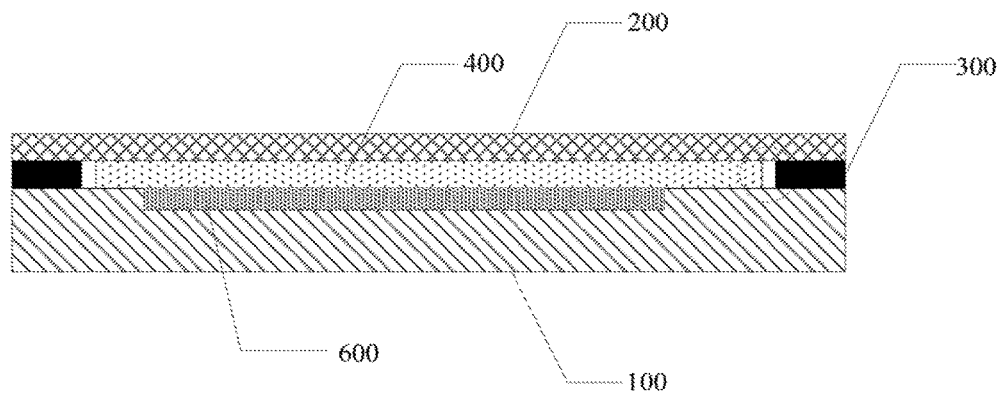
FIG. 1 illustrates a cross-sectional view of an exemplary display device according to the disclosed embodiments of the present disclosure.

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

It should be noted that, in the drawings of the present disclosure, the thickness and shape of a film or a layer are merely for illustrative purposes and do not reflect the actual ratios of the structures.

The method of attaching the protective cover onto the display panel may cause a gap to be formed between the cover and the display panel. That is, an air layer or air gap, with a refractive index of about 1, may be formed between the protective cover and the display panel. The display panel has a refractive index of about 1.5. As a result, light exiting the display panel may undergo refraction at the interface between the air layer and the cover may cause the refractive index of the display panel to increase. The transmission rate of the display panel may thus decease.

Embodiments of the present disclosure provide a display device and a fabrication method tier forming the display device. The display device may include a display panel with touch-sensing components, a protective cover, a sealant layer, and a transparent protective layer. The sealant layer may be configured to fix the protective cover on the display region or active area (AA) of the display panel. The transparent protective layer may be configured to fill up the gap between the display panel and the protective cover. The refractive index of the transparent protective layer may be substantially close to the refractive index of the protective layer. For example, the refractive index of the transparent protective layer may be equal to or higher than the refractive index of the protective cover. Because the transparent protective layer is used to fill up the gap between the protective cover and the display panel, the refractive index of the transparent protective layer being sufficiently close to the refractive index of the protective cover, light refraction at the interface between the transparent protective layer and the protective cover may be avoided or reduced. Optical issues such as an increase of the refractive index of the display device and a decrease of the light transmission rate may be reduced. The optical display effect of the disclosed display device may be improved. In addition, because sealant layer can be formed through common fabrication methods, the fabrication of the display device may be less costly.

One aspect of the present disclosure provides a display device.

Figure 2:
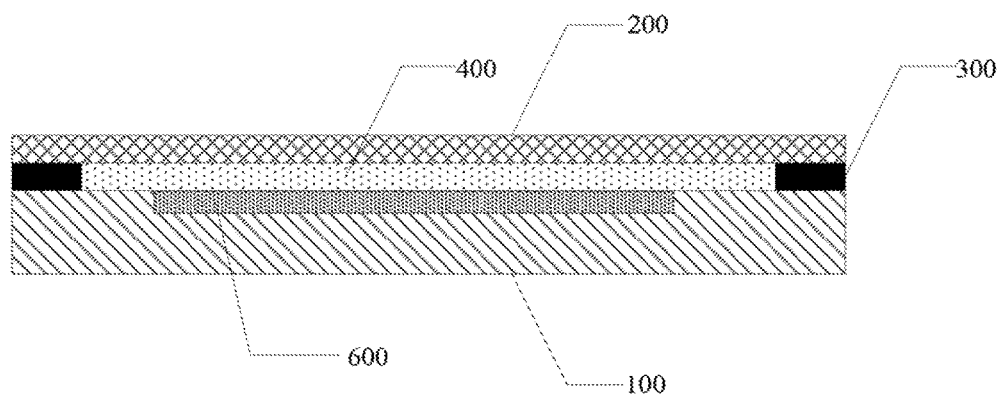
FIG. 2 illustrates a cross-sectional view of another exemplary display device according to the disclosed embodiments of the present disclosure.
Figure 3:
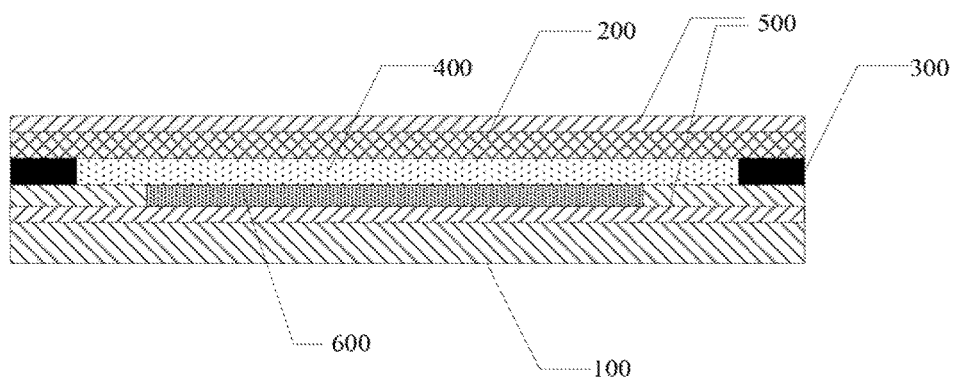
FIG. 3 illustrates a cross-sectional view of another exemplary display device according to the disclosed embodiments of the present disclosure.
Figure 4:
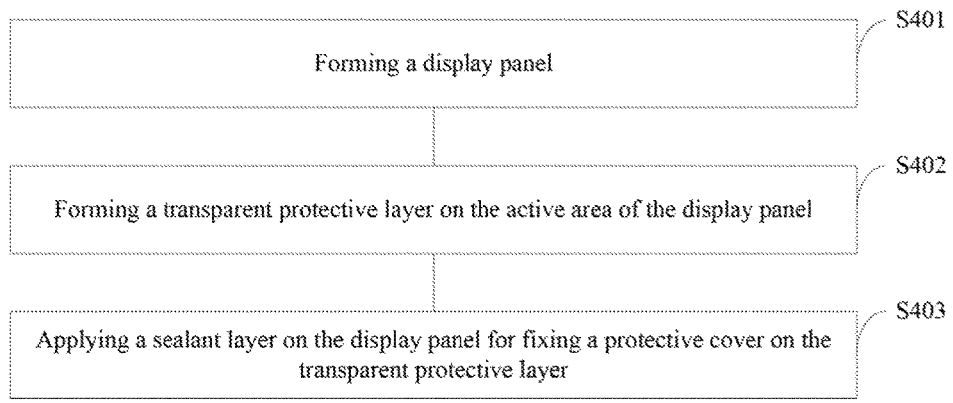
FIG. 4 illustrates an exemplary fabrication method for forming an exemplary display device according to the disclosed embodiments of the present disclosure.

FIGS. 1-3 each illustrates a cross-sectional view of exemplary display devices provided by the present disclosure. FIG. 4 illustrates an exemplary fabrication method for forming the disclosed display device.

In some embodiments, the display device may be a touch display device capable of responding to touch motions. For illustrative purposes, the present disclosure is described in details using a touch display panel. In various other applications, the disclosed configuration of the refractive indices may also be used in other types of display devices to reduce light refraction and increase light transmission at interfaces. The specific types of materials to form the disclosed configuration may be determined according to different applications and should not be limited by the embodiments of the present disclosure.

As shown in FIG. 1, the display device may include a display panel 100, a protective cover 200, and a sealant layer 300. The display panel 100 may include touch-sensing components 600 for touch-sensing functions. The sealant layer 300 may be configured to fix or attach the protective cover 200 on the display panel 100. The display device may further include a transparent protective layer 400 disposed between the display panel 100 and the protective cover 200. The sealant layer 300 may seal the transparent protective layer 400 between the display panel 100 and the protective cover 200, and the transparent protective layer 400 may fill up the space or gap between the display panel 100 and the protective cover 200 that is sealed by the sealant layer 300. The refractive index of the transparent protective layer 400 may be sufficiently close to, e.g., equal to or greater than, the refractive index of the protective cover 200. For illustrative purposes, the touch-sensing components 600 of the display panel 100 is shown at or near the surface of the display panel 100 in FIGS. 1-3. The touch-sensing components 600 may include any suitable parts or structures that facilitate touch functions. For example, the touch-sensing components 600 may include touch-sensing electrodes, touch lines, and related thin-film transistors (TFT) array. In some embodiments, the touch-sensing components 600 may include touch-sensing electrodes disposed on the surface of the display panel 100.

According to the disclosed display device, because the transparent protective layer 400 may be used to fill up the gap between the protective cover 200 and the display panel 100, and the refractive index of the transparent protective layer 400 is sufficiently close to the refractive index of the protective cover 200, light refraction at the interface between the transparent protective layer 400 and the protective cover 200 may be reduced or avoided. The display device is thus less susceptible to optical issues such as increased reflection rate and reduced transmission rate. The optical display effect of the display device may be improved.

In practice, in the disclosed display device, to prevent a gap from being formed between the display panel 100 and the protective cover 200 when the protective cover 200 is being fixed onto the display panel 100 using the sealant layer 300, the transparent protective layer 400 may be disposed on the regions not applied with the sealant layer 300. The thickness of the transparent protective layer 400 and the thickness of the sealant layer 300 may be the same.

For example, the transparent protective layer 400 may be disposed in the display region of the display panel 100. That is, the pattern of the transparent protective layer 400 may be disposed in the AA region of the display panel 100. In some embodiments, as depicted by the dashed circle in FIG. 1, a gap may be formed between the sealant layer 300 and the transparent protective layer 400. Light may also undergo refraction at the gap. For this reason, in some embodiments, as shown in FIG. 2, the boundary of the transparent protective layer 400 may contact the boundary of the sealant layer 300 may, i.e., no gap is formed between the sealant layer 300 and the transparent protective layer 400. The optical display effect of the disclosed display device can be greatly improved.

Further, in the disclosed display device, to prevent light refraction at the interface between the transparent protective layer 400 and the AA of the display panel 100, the refractive index of the transparent protective layer 400 may be designed to be sufficiently close to the refractive index of the portion, i.e., the surface, of the display panel 100 that contacts the transparent protective layer 400. For example, the refractive index of the transparent protective layer 400 may be equal to or less than the portion of the display panel 100 that contacts the transparent protective layer 400. Specifically, the display panel 100 may be of various types, and the surface of a display panel 100 that contacts the transparent protective layer 400 may be different.

In some embodiments, the refractive index of the transparent protective layer 400, the refractive index of the portion of the display panel 100 that contacts the transparent protective layer 400, and the refractive index of the protective cover 200 may be sufficiently close to each other to minimize light refraction at the interface between the transparent protective layer 400 and the AA of the display panel 100.

In some embodiments, the touch-sensing components of the disclosed display device may include touch-sensing electrodes disposed in the display panel 100. A touch-sensing electrode may be a mutual-capacitance electrode or a self-capacitance electrode, depending on the specific embodiments and applications. In this case, the surface or portion of the display panel 100 that contacts the transparent protective layer 400 may be an upper substrate on the display panel 100. The upper substrate may be made of a same glass material as the protective cover 200. For example, the refractive index of glass is often about 1.5 to 1.7. Thus, the material to form the transparent protective layer 400 may be chosen to have a refractive index of about 1.5 to 1.7. The upper substrate may also be made of other suitable materials, and the material to form the transparent protective layer 400 may be chosen accordingly to satisfy the requirements described above.

In some other embodiments, the touch-sensing components of the disclosed display device may include touch-sensing electrodes disposed on the surface of the display panel 100. The touch-sensing electrodes disposed on the surface where the display panel 100 and the transparent protective layer 400 contact may be transparent. The touch-sensing electrodes may be made of indium tin oxide (ITO), which has a refractive index of about 1.7 to 2.2. In this case, the material to form the transparent protective layer 400 may be chosen to have a refractive index of about 1.5 to 1.7.

Further, to ensure the touch-sensing electrodes contacting the transparent protective layer 400 can function properly, the transparent protective layer 400 should be made of an insulating material.

It should be noted that, in practice, regardless of the type of touch-sensing components, the transparent protective layer 400 may be made of a material with a refractive index of about 1.5. In addition, a planarization layer e.g., an overcoat (OC) layer, may be used as the transparent protective layer 400. In this case, when fabricating the display device, the planarization layer may be formed on the display panel 100 by using a same transfer-printing mask for forming or printing the AA of the display panel 100. As a result, the fabrication of the transparent protective layer 400 or the display device may be simplified.

In practice, various types of display panels may be integrated into the disclosed display device. For example, the display panel 100 described in the present disclosure may be a liquid crystal display (LCD) panel, an organic light-emitting diode (OLED) display panel, a cathode ray tube (CRT) display panel, a plasma display panel, an electronic paper, or an electroluminescent display panel. Further, the disclosed display device may be a mobile phone, a tablet, a television, a monitor, a laptop, a digital photo frame, a navigator, or any products or parts with display functions.

Further, when the display panel 100 is an LCD panel, a polarizer 500 may be disposed on the protective cover 200, as shown in FIG. 3. In some embodiments, the polarizer 500 may be disposed on the side of the protective cover 200 that is facing away from the LCD panel. In some embodiments, a polarizer 500 may be disposed under the TFT array or the touch-sensing components, e.g., on the side of the upper substrate that is facing away from the TFT array.

Another aspect of the present disclosure provides a fabrication method for forming the disclosed display device.

Specifically, as shown in FIG. 4, the fabrication method may include steps S401-S403.

In step S401, a display panel with touch-sensing components may be formed.

In some embodiments, the display panel may include a top substrate and a bottom substrate. The top substrate and bottom substrate may be made of glass. TFT array fabrication may be used to form pixel electrodes arranged in an array on the bottom substrate, each pixel electrode corresponding to a subpixel. A pixel electrode may be electrically connected to the drain electrode of a TFT through a via hole. The source electrode of a TFT may be connected to a signal bus line. The gate electrode of a TFT may be connected to a gate bus line. Thus, the gate bus line may be used to control the on and off states of each subpixel. When a TFT is on, the source electrode and the drain electrode of the TFT may be connected through the channel region formed in between.

In some embodiments, a light shielding matrix, a black matrix, and red, green, and blue (RGB) pixels may be formed on the top substrate. The pixels may be formed by forming a color filter (CF) layer through a photolithography process. Further, a planarization layer, e.g., an overcoat (OC) layer, may be formed on the light shielding matrix and the RGB pixels. Photo spacers may be formed on the planarization layer.

Further, touch-sensing electrodes, e.g., made of ITO, may be formed on the other side of the lower substrate that faces away from the CF layer.

In step S402, a transparent protective layer may be formed on the AA of the display panel.

A suitable material for forming the transparent protective layer may be coated on the touch-sensing electrodes to form the transparent protective layer. In some embodiments, the material for forming the transparent protective layer may be the same material to form the OC layer. The thickness of the transparent protective layer may be the same as the thickness of the subsequently-formed sealant layer. Far example, the thickness of the transparent protective layer may be about 100 μm. In some embodiments, the refractive index of the transparent protective layer may be about 1.5.

In some embodiments, a transfer-printing process may be used to form the transparent protective layer on the AA of the display panel. The transfer-printing mask of the transfer printing process may be the same transfer-printing mask used for forming the AA of the display panel.

The lower substrate may be flipped over and aligned to be bonded with the upper substrate so that the CF layer is facing the upper substrate and the transparent protective layer is facing away from the upper substrate. The photo spacers may be positioned between the upper substrate and the lower substrate. A cutting process or single cutting process may be performed to remove or separate certain pans of the bonded upper substrate and lower substrate and form a display panel.

In step S403, a sealant layer may be applied on the display panel for fixing a protective cover on the transparent protective layer. The protective cover may cover the transparent protective layer.

A sealant layer may be applied on the lower substrate for attaching or fixing a protective cover. The sealant layer may be applied on the same side with the transparent protective layer on the lower substrate. The thickness of the sealant layer may be the same as the thickness of the transparent protective layer. Further, the protective cover may be attached or bonded onto the display panel through the sealant layer to cover the transparent protective layer.

In some embodiments, a gap may be formed between the pattern of the transparent protective layer and the pattern of the sealant layer. In some other embodiments, the boundary of the transparent protective layer may contact the boundary of the sealant layer, i.e., no gap is formed between the pattern of the transparent protective layer and the pattern of the sealant layer.

Because sealant layer can be formed through common methods, the fabrication of the display device may be less costly.

In some embodiments, the display panel may be an LCD panel. In this case, an upper polarizer may be formed on the protective cover. In some embodiments, a lower polarizer may be formed on the upper substrate on the side facing away from the TFT array.

It should be noted that, the order of the fabrication steps may be adjusted or changed, depending on different embodiments and applications. In practice, the actual order of the fabrication steps to form the disclosed display device should not be limited by the embodiments of the present disclosure.

The present disclosure provides a display device and a fabrication method for forming the display device. The display device may include a display panel with touch-sensing components, a protective cover, a sealant layer, and a transparent protective layer. The sealant layer may be configured to fix the protective cover on the display region or AA of the display panel. The transparent protective layer may be configured to fill up the gap between the display panel and the protective cover. The refractive index of the transparent protective layer may be sufficiently close to the refractive index of the protective cover. Because the transparent protective layer is used to fill up the gap between the protective cover and the display panel, the refractive index of the transparent protective layer being sufficiently close to the refractive index of the protective cover, light refraction at the interface between the transparent protective layer and the protective cover may be avoided or reduced. Optical issues such as an increase of the refractive index of the display device and a decrease of the light transmission rate may be reduced. The optical display effect of the disclosed display device may be improved. In addition, because the sealant layer can be formed through common fabrication components and methods, the fabrication of the display device may be less costly.

It should be noted that, the sealant layer may at least substantially surround the AA of the display panel, which may have various patterns or shapes such as a rectangular shape, a triangular shape, and a circular shape. The pattern or shape of the transparent protective layer may follow or correspond to the pattern or shape of the sealant layer, and protective cover may also have a corresponding shape to cover the AA of the display panel. The specific shapes or patterns of the AA of the display panel, the transparent protective layer, the sealant layer, and the protective cover should not be limited by the embodiments of the present disclosure and should be determined or adjusted according to different applications and designs.

Embodiments of the present disclosure also provide a semiconductor device with a display panel or light transmitting surface/panel with a protective layer and a protective cover. The semiconductor device may have a surface that needs to the protected. The semiconductor device may include a protective cover, a sealant layer, and a transparent protective layer. The sealant layer may be configured to fix the protective cover on the surface/panel that needs to be protected. The transparent protective layer may be configured to fill up the gap between the to be protected surface and the protective cover. For light transmitting surfaces/panels, the refractive index of the transparent protective layer may be sufficiently close the refractive index of the protective cover.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A display device, comprising:
a display panel including touch-sensing components;
a first polarizer;
a sealant layer on the display panel;
a transparent protective layer covering an active area of the display panel; and
a protective cover fixed by the sealant layer to cover the transparent protective layer,
wherein:
the transparent protective layer fills up a gap between the protective cover and the display panel, and a refractive index of the transparent protective layer is substantially close to a refractive index of the protective cover,
the touch-sensing components are configured to sense and respond to a touch motion, and the touch-sensing components contact the transparent protective layer,
the refractive index of the transparent protective layer is equal to or less than a refractive index of the touch-sensing components, and
the first polarizer is arranged on a surface of the protective cover, away from the transparent protective layer.

2. The display device according to claim 1, wherein a gap is formed between the transparent protective layer and the sealant layer.

3. The display device according to claim 1, wherein a boundary of the transparent protective layer contacts a boundary of the sealant layer.

4. The display device according to claim 1, wherein the refractive index of the transparent protective layer is substantially close to the refractive index of the touch-sensing components.

5. The display device according to claim 4, wherein the refractive index of the transparent protective layer is about 1.5 to 1.7.

6. The display device according to claim 1, wherein the transparent protective layer is a planarization layer made of an insulating material.

7. The display device according to claim 1, wherein the display panel is one of a liquid crystal display (LCD) panel, an organic light-emitting diode (OLED) display panel, a cathode ray tube (CRT) display panel, a plasma display panel, an electronic paper, or an electroluminescent display panel.

8. The display device according to claim 1, wherein the display panel is a touch display panel with the touch-sensing components.

9. The display device according to claim 1, wherein the touch-sensing components include touch-sensing electrodes on the display panel covered by the transparent protective layer.

10. The display device according to claim 9, wherein a refractive index of the touch-sensing electrodes is about 1.7 to 2.2.

11. The display device according to claim 1, wherein the touch-sensing components include touch-sensing electrodes.

12. The display device according to claim 11, wherein:
the display panel is an LCD panel, and a second polarizer is formed under the touch-sensing components in the display panel.

13. The display device according to claim 1, wherein:
the transparent protective layer and the sealant layer both are in direct contact with the display panel and the protective cover.

14. The display device according to claim 1, wherein:
a thickness of the sealant layer and a thickness of the transparent protective layer are approximately the same.

15. The display device according to claim 1, wherein:
a first contact region of a bottom surface of the transparent protective layer with respect to the display panel has a same area size as a second contact region of a top surface of the transparent protective layer with respect to the protective cover.

16. A fabrication method for forming a display device, the display device having a display panel, a first polarizer, a sealant layer on the display panel, a transparent protective layer covering an active area of the display panel, and a protective cover fixed by the sealant layer for covering the transparent protective layer, the method comprising:
providing the display panel with touch-sensing components;
forming the transparent protective layer on the active area of the display panel;
applying the sealant layer on the display panel at a same side as the transparent protective layer; and
binding the protective cover on the transparent protective layer,
wherein:
the transparent protective layer fills a gap between the protective cover and the display panel, a refractive index of the transparent protective layer being substantially close to a refractive index of the protective cover,
the touch-sensing components are configured to sense and respond to a touch motion, and the touch-sensing components contact the transparent protective layer,
the refractive index of the transparent protective layer is equal to or less than a refractive index of the touch-sensing components, and
the first polarizer is arranged on a surface of the protective cover, away from the transparent protective layer.

17. The fabrication method according to claim 16, wherein forming the transparent protective layer on the active area includes:
applying a transfer-printing process to form the transparent protective layer on the active area of the display panel.

18. The fabrication method according to claim 16, wherein:
the transparent protective layer and the sealant layer both are in direct contact with the display panel and the protective cover.

19. The fabrication method according to claim 16, wherein:
a thickness of the sealant layer and a thickness of the transparent protective layer are approximately the same.

20. The fabrication method according to claim 16, wherein:
a first contact region of a bottom surface of the transparent protective layer with respect to the display panel has a same area size as a second contact region of a top surface of the transparent protective layer with respect to the protective cover.

* * * * *